June 26, 1923.
A. HORSTMANN
1,460,339
GAS CONTROLLER AND THE LIKE
Filed Jan. 30, 1923   4 Sheets-Sheet 1
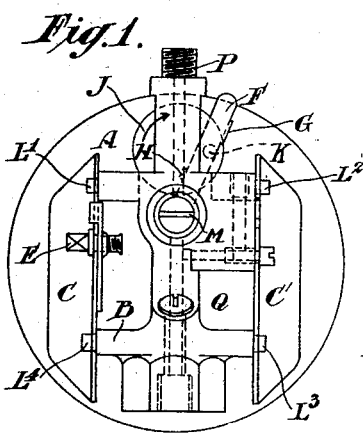
Fig.1.
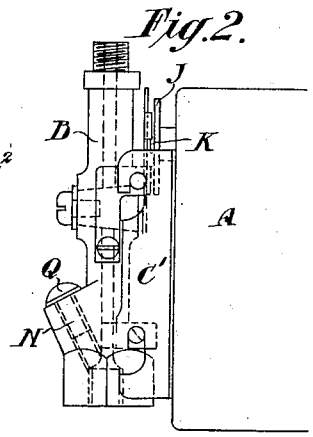
Fig.2.
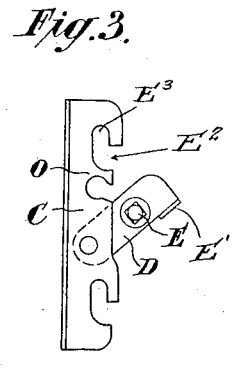
Fig.3.
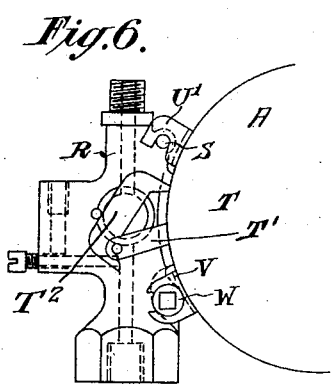
Fig.6.
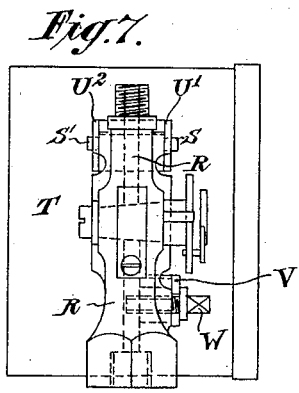
Fig.7.
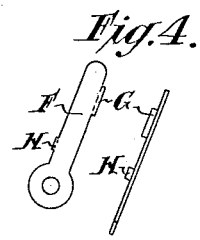
Fig.4.
Fig.5.
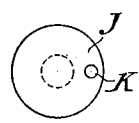
Fig.8.
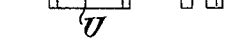
Fig.9.
Fig.10.
INVENTOR
ALBERT HORSTMANN
By
Atty

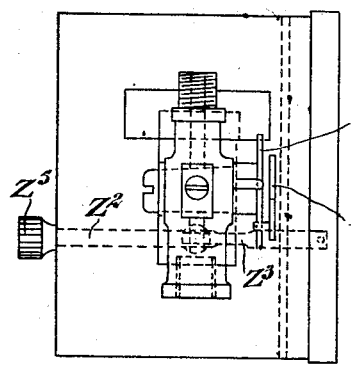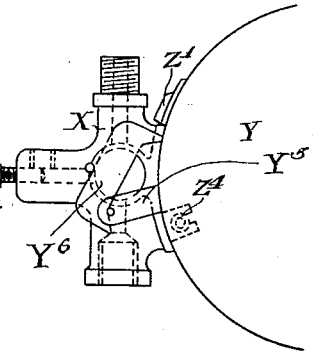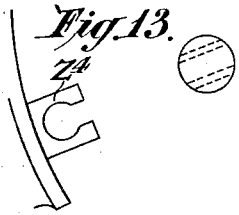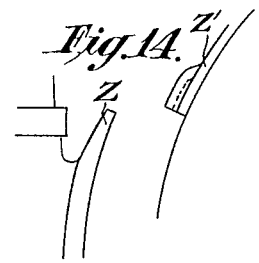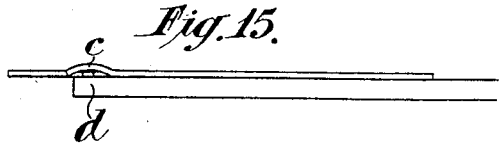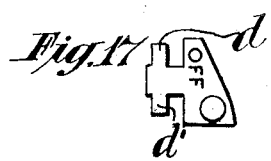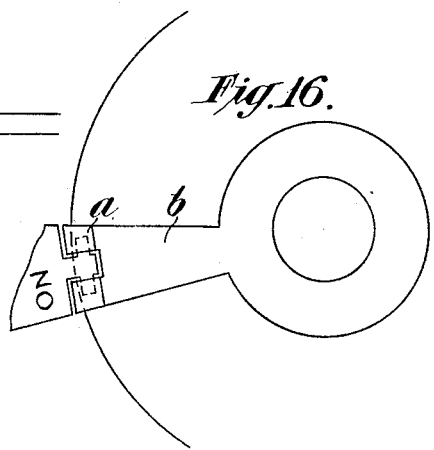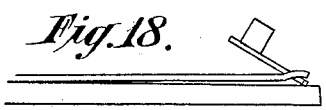

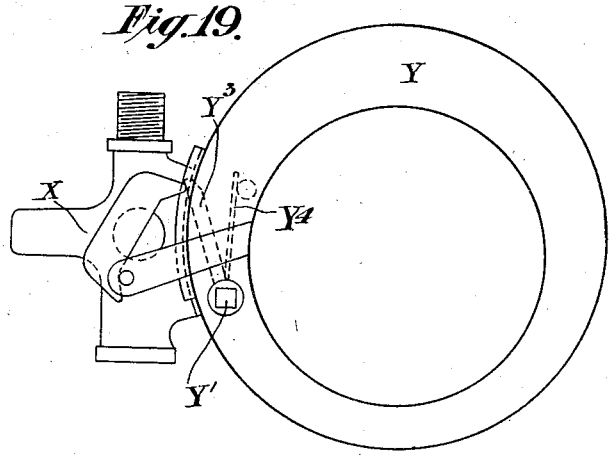
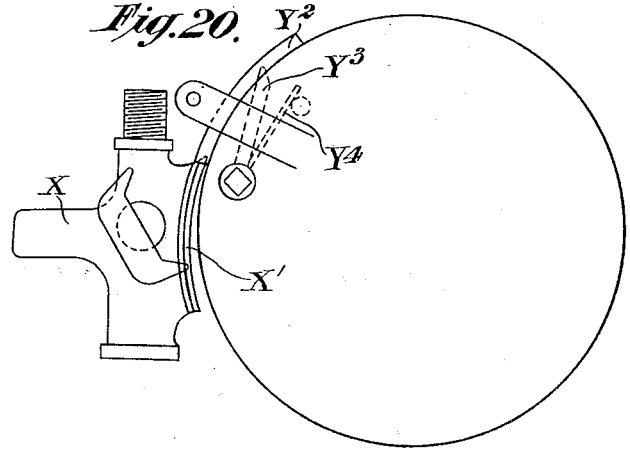

June 26, 1923.

A. HORSTMANN 1,460,339

GAS CONTROLLER AND THE LIKE

Filed Jan. 30. 1923    4 Sheets-Sheet 4

INVENTOR
ALBERT HORSTMANN
By

Patented June 26, 1923.

1,460,339

UNITED STATES PATENT OFFICE.

ALBERT HORSTMANN, OF BATH, ENGLAND, ASSIGNOR TO HORSTMANN GEAR CO. LIMITED, OF BATH, ENGLAND, A COMPANY OF GREAT BRITAIN.

GAS CONTROLLER AND THE LIKE.

Application filed January 30, 1923. Serial No. 615,898.

*To all whom it may concern:*

Be it known that I, ALBERT HORSTMANN, a subject of the King of Great Britain and Ireland, and a resident of Bath, county of Somerset, England, have invented a certain new and useful Improvement in Gas Controllers and the like, of which the following is a specification.

My invention relates to gas controllers and the like of the type which are driven by clockwork mechanism and in which manual adjustment is required at greater intervals than one day, for the lighting and extinguishing of street lamps and the like at predetermined times, and the object of my invention is to incorporate certain improvements rendering them more efficient by enabling the clockwork mechanism to be removed or put out of operation in case of restricted lighting or other cause, without the aid of a skilled mechanic; or, in gas controllers, without incurring waste of gas consequent upon the unscrewing of the gas cock.

I further provide that when the clockwork mechanism is removed, the gas cock or burner or the like is not disturbed. Its removal, although easily accomplished by the unskilled attendant, cannot be accomplished without a knowledge of the secret locking device.

In my present invention I have made the clock work portion and the gas cock or interrupter portion in two separate and self contained units and no loose supplementary parts are required to unite in an operative manner the two said units and each part being interchangeably made, any clock work portion of a given type can be instantly attached in an operative manner and secured to any other gas cock or the like of the same type by an unskilled attendant; the gas cock or the like with its attendant burner and fittings or the like remain permanently in the lamp when the clock work mechanism is removed.

As the operating mechanisms of gas controllers are equally applicable for electricity or for the operation or interruption of other media, the same kind of fittings and attachments applied to an electric switch, would enable the switch to be left "in situ" when the clock is removed and if desired, one type of clock work mechanism could be used in an installation for controlling in common, either gas, electricity or other media.

I further provide means whereby the detachable clock work mechanism is locked to the gas cock, and by preference, I make the lock in the form of a latch, so that by the act of attaching the clock work mechanism, no further locking is required.

When the clock work mechanism requires to be removed, however, only the attendant who is aware how the latching device is operated (which is by preference unlocked by the key which winds the clock) is able to release the controller for its removal. This prevents the danger of theft, by boys climbing the lamp post, etc.

It will thus be seen that in case of discontinued lighting, or of the clock needing repairs, the clockwork mechanism which operates the gas cock can be removed, leaving the gas cock and burner undisturbed in the lamp.

I further provide that the operating levers on the dial plate of the controller which effect the lighting and extinguishing of the lamps at predetermined times may by preference, and when desired, be thrown out of the line of operation of the attendant mechanism, thus enabling the controller to continue working without turning the gas on and off and (or) when more than two operating levers are used on the dial plate, as in the case of two lightings and extinguishings, in 24 hours, etc., certain of these levers may be rendered inoperative, leaving the other or others operative, thus enabling economies to be effected in street lighting, when required.

I also provide that these operating levers may by preference be hinged, and may be made so that they will snap firmly in their required operative or inoperative positions, without removing the dial, or adding further mechanical attachments than those contained in the said hinged levers.

To enable my invention to be fully understood, reference is to be made to the accompanying sheets of drawings.

Figure 1 is a back view in elevation of a gas controller in which the operation of the gas cock is effected by means of a spindle passing through the back of the clock-work portion.

Figure 2 is a side elevation of Figure 1, showing the mode of attaching the clockwork mechanism to the gas cock.

Figure 3 is a detailed drawing of the hook plate showing the latch and the key-lock-screw.

Figure 4 is a detailed drawing of the gas plug lever showing the pallets thereon.

Figure 5 is a detailed drawing of the disc, on which is eccentrically mounted the stud.

Figure 6 is a front elevation of the gas controller in which the operation of the gas cock is effected from the side of the circular case of the clockwork mechanism.

Figure 7 is a side elevation of Fig. 6 showing the mode of attachment of the clockwork to the gas cock.

Figure 8 shows details of the hooking plate of Figures 6 and 7.

Figure 9 shows details of the locking plate of Figures 6 and 7.

Figure 10 shows details of the key-screw-lock of Figures 6 and 7.

Figure 11 is a side elevation showing another form of my invention as applied to controllers where the operation of the gas cock is effected at the side of the circular clock case.

Figure 12 shows front elevation of Figure 11.

Figure 13 shows details of the locking lug.

Figure 14 shows details of tongue and hook plate.

Figure 15 shows the side elevation of the operating lever with hinged extremity, capable of being rendered inoperative when desired.

Figure 16 is a plan of Figure 15.

Figure 17 is a detailed drawing of the hinged extremity.

Figure 18 shows the hinged portion of an operating lever in the inoperative position.

Figure 19 is the front elevation of a gas controller similar to Figure 11, in which the clock work portion is latched to the gas cock by the act of attachment.

Figure 20 is a repetition of Figure 19 showing the flanges of the gas cock entering the channels of the clock work portion in the act of attachment.

Figure 21:
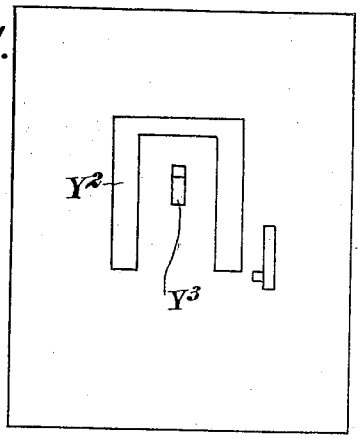
Figure 21 shows the clock work portion of Figure 19 with the latch exposed.

My invention may be carried into effect in various ways. The several instances herein described being those best suited to certain controllers in use, but it is equally applicable to other designs of gas controllers, or electric switches. For example, the device may be applied to gas pipes as shown in Figures 1 to 22 of the drawings, or it may be applied to an electric switch as shown in Fig. 23. In the forms shown in Figs. 1 to 22, inclusive, the time controlled device cooperates with a cut-off member or valve in the gas pipe, and in the construction shown in Fig. 23, the said time controlled device cooperates with a cut-off in the form of an electric switch mounted on a suitable base.

When the clock work portion is of the kind where the power is transmitted to the gas cock through a spindle protruding through the back of the case, the construction seen in Figs. 1-5 is adopted.

In this controller the clock work mechanism "A" is provided with a spindle protruding through the case, which carries a disc J on which is eccentrically mounted the stud or pin K. There also are 2 hook plates C and C¹ (Fig. 1) attached to the clockwork portion, said hook plates or their equivalents constituting hanger means on the time controlled actuating mechanism or clock work.

The gas cock portion B is a separate and distinct unit and is provided with four pivot shaped lugs L¹ L² L³ and L⁴ protruding from the side extensions of the gas cock. The gas cock plug M (which forms the gas valve) has an attached lever F on which are two pallets G and H. When the disc J rotates in the direction of the arrow (Fig. 1) half of a complete revolution, the pin or stud K coming in contact with the pallet G moves the lever F to the position shown in Fig. 1, leaving the said lever F free to be operated by hand if desired, and the stud K free of the pallet G in the position shown. When the disc J has made another half revolution, the opposite movement is effected by the pallet H when the lever is moved to the opposite position and again left free for hand operation.

It will be observed that the lever "F" when moved to either the "on" or "off" positions by the pin "K" of the disc "J," operating on the pallets "G" and "H" respectively, always remains in the position to which it is moved, owing to it having a substantially similar angle of displacement on either side of the perpendicular, and the force of gravity tending to retain the lever in either of the said "on" or "off" position; street vibration would not be liable to turn the gas "off" when "on" or vice versa.

It will thus be seen that the clockwork portion A can be instantly hooked on the gas cock portion B by the hook plates C and $C^1$ the eccentric stud K being always in the position free of the pallets G or H and picking up its right rotation when set in motion by the clock at predetermined times. In Figure 3 will be seen the locking device D which is shown in the drawing in the open position, allowing the clockwork portion to be hooked on to the gas cock but when in position the latch D can be moved so that the ear $E^1$ thereof will close the mouth $E^2$ of the bayonet slot $E^3$ and when the key screw E goes into the recess O and is screwed home, it prevents the latch from being released without the aid of the key. The latch D, can however, be used as a securing device without the key screw E. It will thus be seen that the gas cock portion B can be fixed in position inside the street lantern or elsewhere without the clock portion being attached, and the clockwork portion can be added at any time desired, and all parts being interchangeably made, any clockwork portion A will fit on to any gas cock B of this type, and in like manner the clockwork portion can be removed in case it is desired to discontinue lighting during certain periods of the year or when repairs, etc., are necessary, without disturbing the burner, mantle, or burner fittings, the latter being connected at the outlet P. Thus the gas cock B remains a permanent fitting in the lamp.

I also provide when required, a hole N provided with a screw Q for clearing the service of salts or other foreign matter if desired. In Figures 6 and 7 I show the method of applying my invention to the type of controller in which the gas cock is situated on the side of the circular drum case of the clock.

In the application of my invention to this type of controller one method is to provide the gas cock R with two suitably shaped lugs S and $S^1$ while attached to the case of the clockwork portion T are the hook plates $U^1$ and $U^2$. In attaching the clockwork portion to the gas cock portion the clockwork portion is first hooked to these suitably shaped lugs, when the weight of the clockwork portion will then bring the locking plate V into position to be secured by a key-screw W details of which are shown in Figures 9 and 10. In Figures 6 and 7 the clock work T operates the plug of the gas cock by the arm $T'$ engaging the handle $T^2$ of the plug.

In this mode of application of my invention, it will be seen that the gas cock portion R can remain a permanent fitting in the lamp allowing the clockwork portion T to be removed for the purpose of restricted lighting or repairs, without disturbing the burner, burner fittings, mantle, etc. In Figures 11 and 12 will be seen another method of applying my invention to controllers in which the gas cock portion is situated on the circular side of the case of the clockwork mechanism, and in which the gas cock X remains a permanent fitting in the lamp, while the clockwork mechanism Y can be attached by hooking the hook plate $Z^1$ on to the tongue-piece Z so that the arm $Y^5$ of the clockwork will operate the plug handle $Y^6$. But in this method instead of a key securing the clockwork portion to the gas cock portion, a spindle $Z^2$ is provided (Fig. 11) to pass right through the clock having a necked portion $Z^3$. When the handle $Z^5$ is pulled outward from the back of the clock, the locking lug $Z^4$ will pass over the neck $Z^3$. To secure this locking device, the handle $Z^5$ must be pushed towards the clock again when the larger diameter of the spindle will secure the clock to the gas cock by passing through the round machined portion of the locking lug $Z^4$.

In all three instances given hereinbefore, the gas cocks have provision for the bypass and for the gas adjustment of the same.

In Figures 15, 16, 17 and 18, are seen the method by which further economies can be effected in restricting lighting, and for other purposes, by rendering the levers of the dial plate (which effect the lighting and extinguishing at predetermined times) inoperative when required. In Figure 16 will be seen the dial plate lever (without its clamping device) provided with a hinge $a$ by means of which it may be thrown into position shown in Fig. 18 when desired: the main part of the lever $b$ being of a hard spring metal and slightly domed at its forked extremity $c$ (Fig. 15) acts as a spring upon the extremities $d$ and $d^1$ of Fig. 17 which are placed under the domed portion at $c$ (see Fig. 15) and forms a hinge which enables the extremity to be sprung in either operative or inoperative positions as desired.

In Figure 16, the lever is shown in the operative position as indicated by the legend "on" and in Figure 18 the lever is shown in the inoperative position as indicated by the legend "off." I do not confine myself to this method of hinging although the foregoing has been found convenient and a cheap method of effecting the results required.

It will thus be seen that should lighting and extinguishing be done twice in 24 hours, two "on" and two "off" levers may be placed on the dial, and when desired one "off" and one "on" lever can be thrown out of operation in the summer months by leaving them in the position as shown in Fig. 18, and should at any time, lighting and extinguishing be discontinued in any district, all the levers can be thus thrown out of operation.

Figure 19 of the drawings shows a front elevation of a gas controller similar to Figure 11 in which the clock work Y is latched to the gas cock X simply by the act of attachment, the latch Y³ being forced toward the gas cock X by the pin-spring Y⁴. The unlatching is effected by turning the key square Y' by means of the key which winds the clock. Figure 20 shows how the clock work Y is positioned as in Figure 19. That is to say Figure 20 shows the flanges X' of the gas cock entering the channel Y² of the clock work.

Figure 22:
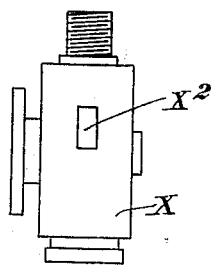
Figure 22 shows the gas cock portion of Figure 19 with the recess to receive the latch which locks the clockwork portion to the gas cock.
Figure 23:
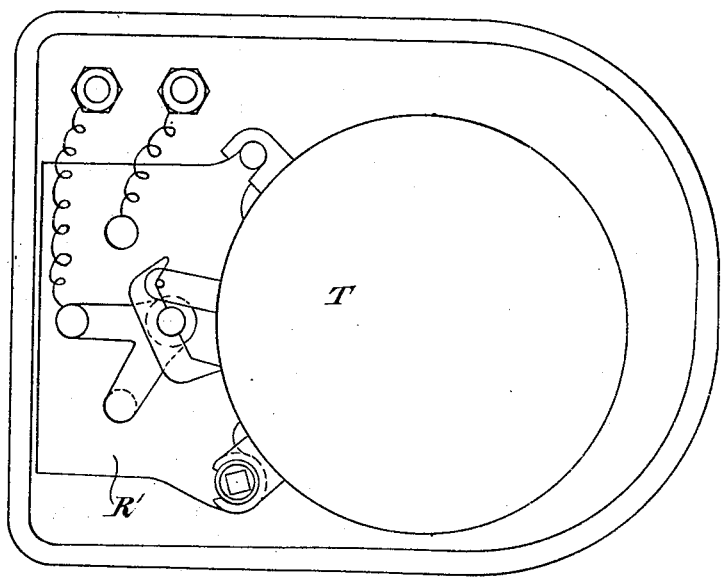
Figure 23 shows one of many instances of the interchangeable use of the clockwork mechanism unit for either gas or electricity; being an electric time switch in which the clock work mechanism which operates the switching unit is the same as used in the gas controller illustrated in Figure 6, the clock work unit being thus interchangeable for either gas or electricity.

Figure 21 shows the clock work of Figure 19 with the latch portion Y³ in elevation, while Figure 22 also shows the gas cock of Figure 19 in such a way as to illustrate the recess X² for receiving the latch Y³ of the clock work.

Figure 23 illustrates the interchangeability of the clock work mechanism for either gas or electricity, the clock work or time mechanism T being shown as operating the handle of a switching mechanism R'. It will thus be apparent that the clock work unit is interchangeable for use with either gas or electricity.

This of course applies also to dials carrying only two levers.

I am aware, in the past that many levered dial plates have had two levers rendered inoperative by combination with the other two levers, but in my present invention each lever can be rendered operative or inoperative independently of any other lever on the dial.

I claim:—

1. An automatic lighting and extinguishing device for street lamps comprising in combination, a fuel conductor for the lamp including a controlling means for the fuel, a time-controlled actuating mechanism for said fuel controlling means, means for attaching and detaching said mechanism as a unit to and from said fuel conductor, said latter means including a latch, and a clamping screw co-operating therewith.

2. An automatic lighting and extinguishing device for street lamps comprising in combination, a fuel conductor for the lamp including a controlling means for the fuel, said controlling means including a lever, and a time-controlled actuating mechanism for said fuel controlling means attachable and detachable as a unit to and from said fuel conductor, said actuating mechanism including a rotatable disc having an eccentric pin engageable with said lever.

3. An automatic lighting and extinguishing device for street lamps comprising in combination a fuel conductor for the lamp, including a controlling means for the fuel, and a time controlled actuating mechanism for said fuel controlling means attachable and detachable as a unit to and from said fuel conductor, said attachable and detachable means comprising pivot lugs fixed to the conductor and hook plates fixedly secured to the time controlled mechanism for engagement with the pivot lugs on the conductor.

4. An automatic lighting and extinguishing device for lamps comprising in combination, a member carrying a cut-off for the lamp, a time controlled actuating mechanism for said cut-off, and means for attaching and detaching said mechanism as a unit to and from said member carrying the cut-off, said means including a hanger plate and a pivoted latch cooperating therewith.

5. An automatic lighting and extinguishing device of the class described comprising in combination, a member carrying a controlling lever, and a time controlled actuating mechanism attachable and detachable as a unit to and from said member carrying the control lever, said actuating mechanism including a rotatable disk having an eccentric pin engageable with said lever, the centers of the disk and lever fulcrum being vertically aligned.

In testimony whereof I have affixed my signature hereto this 8th day of January 1923.

ALBERT HORSTMANN.